(12) United States Patent
Lauw et al.

(10) Patent No.: US 8,147,602 B2
(45) Date of Patent: Apr. 3, 2012

(54) DYE-BASED INK

(75) Inventors: Hiang P Lauw, Corvallis, OR (US);
Linda C. Uhlir-Tsang, Corvallis, OR (US); John R Moffatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/683,592

(22) Filed: Jan. 7, 2010

(65) Prior Publication Data

US 2010/0112222 A1    May 6, 2010

Related U.S. Application Data

(63) Continuation of application No. 11/071,479, filed on Mar. 3, 2005, now Pat. No. 7,674,328, which is a continuation-in-part of application No. 10/400,131, filed on Mar. 25, 2003, now Pat. No. 7,052,537.

(60) Provisional application No. 60/610,922, filed on Sep. 17, 2004.

(51) Int. Cl.
*C09D 11/02* (2006.01)

(52) U.S. Cl. .................................. 106/31.43

(58) Field of Classification Search ............... 106/31.43
See application file for complete search history.

(56) References Cited

U.S. PATENT DOCUMENTS

| | | | |
|---|---|---|---|
| 5,017,224 A | 5/1991 | Tomita et al. | |
| 5,026,425 A | 6/1991 | Hindagolla et al. | |
| 5,108,503 A | 4/1992 | Hindagolla et al. | |
| 5,120,361 A | 6/1992 | Winnik et al. | |
| 5,156,675 A | 10/1992 | Breton et al. | |
| 5,266,106 A | 11/1993 | Breton | |
| 5,342,439 A | 8/1994 | Lauw | |
| 5,401,303 A | 3/1995 | Stoffel et al. | |
| 5,536,306 A | 7/1996 | Johnson et al. | |
| 5,626,655 A | 5/1997 | Pawlowski et al. | |
| 5,674,314 A | 10/1997 | Auslander et al. | |
| 5,788,754 A * | 8/1998 | Deardurff et al. | 106/31.58 |
| 5,958,121 A | 9/1999 | Lin | |
| 5,973,026 A | 10/1999 | Burns et al. | |
| 6,019,828 A | 2/2000 | Rehman | |
| 6,183,548 B1 | 2/2001 | Erdtmann et al. | |
| 6,184,268 B1 | 2/2001 | Nichols et al. | |
| 6,193,792 B1 | 2/2001 | Fague | |
| 6,248,161 B1 * | 6/2001 | Nguyen et al. | 106/31.27 |
| 6,261,350 B1 | 7/2001 | Kabalnov | |
| 6,281,269 B1 | 8/2001 | Schut | |

(Continued)

FOREIGN PATENT DOCUMENTS

EP        1213332 A1 *   6/2002

(Continued)

OTHER PUBLICATIONS

JP Notification of Reason for Rejection, Patent App. No. 2007-532,341, dispatched on Feb. 1, 2011.

*Primary Examiner* — Jerry Lorengo
*Assistant Examiner* — Veronica F Faison

(57) ABSTRACT

A dye-based ink includes a dye and a solvent. The dye-based ink has a high print quality on plain paper. The dye-based ink may have a print quality similar to pigment-based inks. This may be particularly relevant for black inks.

16 Claims, 3 Drawing Sheets

U.S. PATENT DOCUMENTS

| | | |
|---|---|---|
| 6,288,164 B2 | 9/2001 | Hanzlik |
| 6,300,391 B2 | 10/2001 | Parazak et al. |
| 6,341,856 B1 | 1/2002 | Thompson et al. |
| 6,372,818 B1 | 4/2002 | Kimura et al. |
| 6,406,138 B1 * | 6/2002 | Gore ............................... 347/96 |
| 6,423,487 B2 | 7/2002 | Naoi |
| 6,432,183 B1 | 8/2002 | Kabalnov |
| 6,461,418 B1 | 10/2002 | Yue et al. |
| 6,468,337 B1 | 10/2002 | Gundlach et al. |
| 6,607,589 B2 | 8/2003 | Adamic et al. |
| 6,635,747 B2 | 10/2003 | Wight et al. |
| 6,641,257 B1 | 11/2003 | Shi et al. |
| 6,648,951 B2 | 11/2003 | Chen et al. |
| 6,656,228 B1 | 12/2003 | Sherwin et al. |
| 6,673,140 B2 | 1/2004 | Tyrell et al. |
| 6,706,102 B2 | 3/2004 | Blease et al. |
| 6,712,892 B2 | 3/2004 | Andrievsky et al. |
| 6,722,765 B2 | 4/2004 | Rolly et al. |
| 6,740,689 B1 | 5/2004 | Lee et al. |
| 6,783,580 B2 | 8/2004 | Tyvoll et al. |
| 7,442,245 B2 * | 10/2008 | Blease et al. ............... 106/31.58 |
| 2002/0144626 A1 * | 10/2002 | Schut ........................ 106/31.58 |
| 2003/0079647 A1 * | 5/2003 | Kaneko et al. ............. 106/31.43 |
| 2003/0116058 A1 * | 6/2003 | Hopper et al. ............. 106/31.43 |
| 2003/0169319 A1 | 9/2003 | Rolly et al. |
| 2004/0244642 A1 | 12/2004 | Uji et al. |
| 2005/0126434 A1 * | 6/2005 | Feldkamp .................. 106/31.43 |
| 2005/0137282 A1 | 6/2005 | Cagle et al. |
| 2006/0203057 A1 * | 9/2006 | Lauw et al. .................... 347/100 |

FOREIGN PATENT DOCUMENTS

| | | |
|---|---|---|
| EP | 1388577 | 2/2004 |
| EP | 1491594 | 12/2004 |
| EP | 1607453 | 12/2005 |
| JP | H4-81475 | 3/1992 |
| JP | H7-314888 | 12/1995 |
| JP | H10-140061 | 5/1998 |
| JP | H10-315474 | 12/1998 |
| JP | 2000-129179 | 5/2000 |
| JP | 2002-513098 | 5/2002 |
| JP | 2002-371207 | 12/2002 |
| JP | 2003-277653 | 10/2003 |
| WO | WO 03/078532 | 9/2003 |

* cited by examiner

DYE-BASED INK

CROSS REFERENCE TO RELATED APPLICATIONS

This application is a continuation of U.S. patent application Ser. No. 11/071,479, filed Mar. 3, 2005, now U.S. Pat. No. 7,674,328 which is a continuation-in-part of U.S. patent application Ser. No. 10/400,131, filed Mar. 25, 2003, now U.S. Pat. No. 7,052,537. This application also claims the benefit of U.S. Provisional Application Ser. No. 60/610,922, filed Sep. 17, 2004. Each of these applications is incorporated by reference herein in its entirety.

BACKGROUND

Ink jet printing is generally a non-impact method for producing images by the deposition of ink droplets in a pixel-by-pixel manner to an image-recording element in response to digital signals.

The inks used in the various ink jet printers can be classified as either dye-based or pigment-based. A dye is a colorant, which is dissolved in the carrier medium. A pigment is a colorant that is insoluble in the carrier medium, but tends to be dispersed/suspended in the form of small particles, often stabilized against flocculation and settling by the use of dispersing agents. Pigment-based inks are generally considered to be less stable than dye-based Inks. The carrier medium can be a liquid or a solid at room temperature in both cases. Commonly used carrier media include water, mixtures of water and organic co-solvents and high boiling organic solvents, such as hydrocarbons, esters, ketones, etc.

Plain paper is generally used to refer to paper that has not been specially coated or designed for specialty uses. Plain paper is generally composed of cellulose fibers and fillers. In many cases, fillers tend to be anistropic to the flow of ink and generally have little effect on wicking. However, when ink travels along and through cellulose fibers, the flow tends to be directional, and if a dye is deposited along the way, either through bonding at active sites or evaporation of the solvents, it is seen as wicking. Dye-based inks where the dye tends to penetrate into the paper and/or wick, tend to result in low optical density and/or ragged edges.

Pigment-based inks tend not to have the same problems as dye-base inks when printed on plain paper. Pigment based inks have been formed which can create a high print quality (PQ) on plain paper. Due to the fact that pigment-based inks have been found to provide higher print quality than traditional dye-based inks, traditional wisdom has been that inks requiring a high print quality (typically black inks) should be pigment-based inks. One such high print quality pigment-based ink is sold by Hewlett Packard under the trade-name HP 56 black ink jet print cartridge for the Deskjet 5550, product # C6656AN.

DETAILED DESCRIPTION

Figure 1:
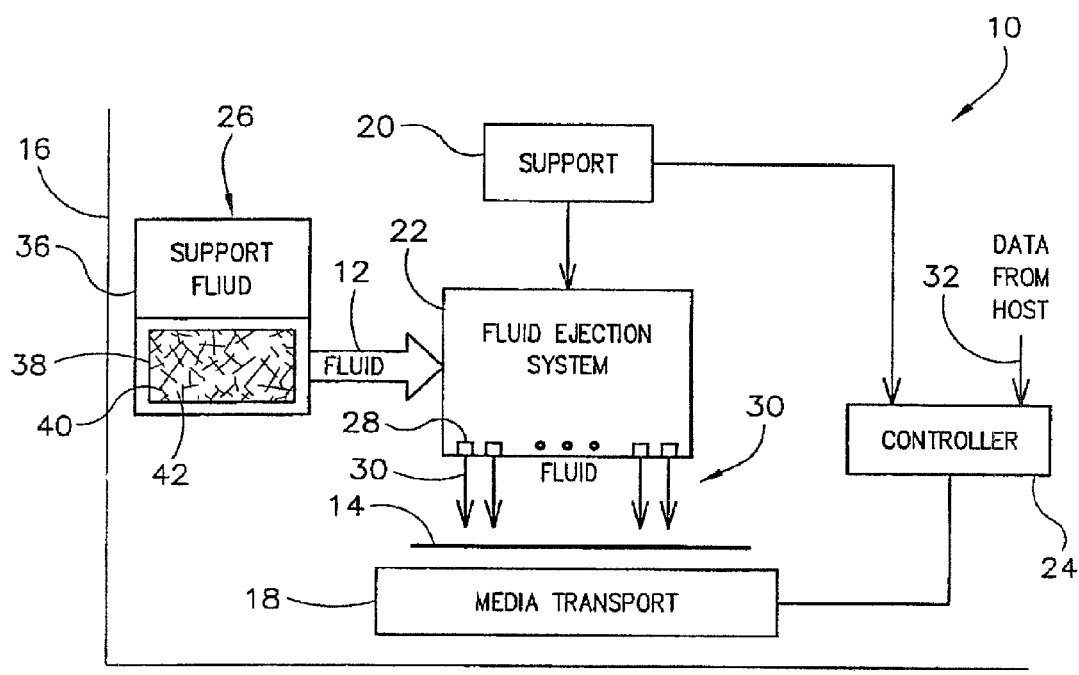
FIG. 1 is a schematic illustration of a fluid deposition system including a fluid supply media according to one exemplary embodiment.

According to many embodiments disclosed herein, a dye-based ink may be formed which exhibits a high print quality on plain paper. Further, many of these embodiments provide inks having at least a similar print quality on plain paper as those pigment-based inks demonstrating high print quality (i.e. the dye-based inks have a print quality that is substantially the same as or better than the print quality of the high print quality pigment-based inks).

Print quality generally refers to various properties of the ink including the thinness of the lines printable using the ink, the optical density of the ink, and edge acuity/sharpness. Relative print quality may be determined by printing a common image using two or more different types of inks and comparing the quality of the images. Print quality may be judged with reference to a standard such as a laser printer image.

According to some embodiments, a dye-based ink is provided which has a high optical density on plain paper. According to some embodiments, the dye-based ink has an optical density of at least about 1.3. According to some of these embodiments, the ink has an optical density of at least 1.4 or at least about 1.45. According to some of these embodiments, the ink has an optical density of at least about 1.5.

According to many embodiments, the dye-based ink comprises a solvent and a dye. The dye-based ink may also comprise surfactants, humectants, biocides, anti-kogation agents, buffers, and/or other additives.

Many dye-based inks include water as a solvent, and may also include a cosolvent. Cosolvents used in dye-based inks tend to be organic cosolvents. According to some embodiments, the ink may comprise up to about 20 wt. % cosolvent. According to some of these embodiments, the ink may comprise up to about 16 wt. % cosolvent. According to some embodiments, the ink may comprise at least about 5 wt. % cosolvent. According to some of these embodiments, the ink may comprise at least about 8 wt. % cosolvent. According to one embodiment, the ink comprises about 10 wt. % to about 16 wt. % cosolvent.

The cosolvent used in the ink may be selected based on polarity, where polarity generally refers to the sum of the molecular properties responsible for the interaction forces between cosolvent and solute molecules. Polarity may be measured for a cosolvent based on its $E_T(30)$ value. For a more detailed description of this parameter, see "Solvents and Solvent effects in organic chemistry," second edition by C. Reichardt. For reference, water generally has an $E_T(30)$ value of 63 kcal/mol and most diols and glycols tend to have $E_T(30)$ values of about 50 to 55.

In some embodiments, a cosolvent may be selected such that it has an $E_T(30)$ value of no more than about 45 kcal/mol. In some embodiments of the ink, each of the cosolvents or molecules which may serve as cosolvents in the ink has an $E_T(30)$ value of no more than about 45 kcal/mol.

According to some embodiments, a cosolvent may be selected such that it has an $E_T(30)$ value of at least about 25 kcal/mol. According to some of these embodiments, a cosolvent may be selected such that it has an $E_T(30)$ value of at least about 30 kcal/mol or at least about 35 kcal/mol. In some embodiments, all of the cosolvent (which may include one or more different types of cosolvent), or molecules which may serve as cosolvent, that is present in the ink would meet one or more of the previously listed $E_T(30)$ value parameters. Specifically, every cosolvent present in the ink may have an $E_T(30)$ value of at least about 25 kcal/mol. According to some of these embodiments, each cosolvent present in the ink may be selected such that it has an $E_T(30)$ value of at least about 30 kcal/mol or at least about 35 kcal/mol.

Some exemplary cosolvents which may be used for a dye-based ink having a high print quality may include 2-pyrrolidinone, 1-(2-hydroxyethyl)-2-pyrrolidinone, 3-pyridylcarbinol, 4-pyridylcarbinol, 3-(3-pyridylamino)-propionitrile, 4-(2-hydroxyethyl)-morpholine, 4-hydroxy-1-methyl-piperidine, 1-(2-hydroxyethyl)-2-imidazolidinone, N-(2-hydroxyethyl)morpholine and combinations thereof. These cosolvents are believed to have $E_T(30)$ values in the ranges discussed above and may be present in amounts as discussed above.

U.S. patent application Ser. No. 10/400,131 titled SOLVENT SYSTEMS FOR INK-JET INKS, filed on Mar. 25, 2003, relates to inks having improved decap, recovery, and color attributes. The disclosure of this application is hereby Incorporated by reference in its entirety to the extent that it is consistent with the present disclosure.

In addition to the cosolvent, the dye-based ink comprises a dye. According to some embodiments, the ink may comprise at least about 0.1 wt. % dye. According to some of these embodiments, the ink may comprise at least about 1 wt. % or at least about 2 wt. % dye. According to some embodiments, the ink may comprise up to about 10 wt. % dye. According to some of these embodiments, the ink may comprise up to about 6 wt. % dye.

According to some embodiments, the dye may comprise an anionic dye. According to some embodiments, the dye may comprise an azo-dye (including dis- and trisazo), phthalocyanine dye, and/or xanthene dye, and may be sulfonated, carboxylated, and/or metallized. Exemplary dyes which may be used include Direct Black 168, Projet Fast Black, and/or Projet Cyan 1, all available from Avecia; and/or Acid Red 52 available from Warner Jenkins.

An ink according to some embodiments may comprise a black dye and may be a black ink. In other embodiments, the ink is a non-black ink.

According to some embodiments, the ink may comprise surfactants. In some embodiments, the surfactant may be anionic or non-ionic and may be a high HLB surfactant. Exemplary surfactants include polymeric alkoxylates (e.g. Solsperse 2000 from The Lubrizol Corporation), secondary alcohol ethoxylates (e.g., Tergitol series available from Union Carbide Co.), fluoro surfactants (such as FC170C available from 3M), fatty acid ethoxylate surfactants (e.g., Alkamul PSMO-20 available from Rhone-Poulenc), fatty amide ethoxylate surfactants (e.g., Aldamide L203 available from Rhone-Poulenc), amine oxide surfactants, sulfonyl surfactants, and diphenyl sulfonate derivatives.

According to some embodiments, the ink may comprise up to about 1 wt. % surfactant. According to some of these embodiments, the ink may comprise up to about 0.5 wt. % or up to about 0.25 wt. % surfactant. According to some embodiments, the ink may comprise up to about 1 wt. % high HLB surfactant. According to some of these embodiments, the ink may comprise up to about 0.5 wt. % or up to about 0.25 wt. % high HLB surfactant. The HLB (hydrophilic-lipophilic balance) value empirically quantifies the balance between the hydrophilic and hydrophobic parts of a surfactant molecule in terms of both size and strength. HLB values of nonionic surfactants range from 1 to 40, with lower values indicating greater solubility in oil and higher values indicating greater solubility in water. While what constitutes a high HLB may vary by surfactant, a surfactant with a high HLB value would generally have a HLB value in water of at least about 20.

According to some embodiments, the ink comprises at least about 0.01 wt. % surfactant. According to some of these embodiments, the ink comprises at least about 0.05 wt. % or 0.3 wt. % surfactant.

According to some embodiments, the ink may comprise a humectant. If a humectant is used, it may be selected so that it will have an $E_T(30)$ value within the range discussed above for the cosolvent. Particularly, in some embodiments, a humectant may be selected such that it has an $E_T(30)$ value of no more than about 45 kcal/mol. According to some embodiments, a humectant may be selected such that it has an $E_T(30)$ value of at least about 25 kcal/mol. According to some of these embodiments, a humectant may be selected such that it has an $E_T(30)$ value of at least about 30 kcal/mol or at least about 35 kcal/mol. According to some embodiments, the cosolvent that is selected serves as a humectant.

According to some embodiments, the dye-based ink comprises up to about 25 wt. % humectant. According to some of these embodiments, the ink comprises up to about 15 wt. % or up to about 5 wt. % humectant. According to some embodiments, the dye-based ink does not comprise any humectant.

The ink may comprise biocide to suppress growth of microorganisms. According to some embodiments, the ink comprises up to about 5 wt. % biocide. According to some of these embodiments, the ink comprises up to about 2 or up to about 1 wt. % biocide. According to some embodiments, the ink comprises at least about 0.1 wt. % biocide. According to some of the embodiments, the ink comprises at least about 0.2 wt. % or at least about 0.5 wt. % biocide. Exemplary biocides include Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250.

The ink may comprise buffer/pH control agent to control the pH of the ink. According to some embodiments, the ink comprises up to about 10 wt. % buffer or other pH control agent. According to some of these embodiments, the ink comprises up to about 2 wt. % or up to about 1 wt. % buffer. According to some embodiments, the ink comprises at least about 0.1 wt. % buffer or other pH control agent. According to some of the embodiments, the ink comprises at least about 0.2 wt. % or at least about 0.5 wt. % buffer. Exemplary buffers include Trizma Base, available from companies such as Aldrich Chemical (Milwaukee, Wis.), 4-morpholineethanesulfonic acid (MES), and 4-morpholinepropanesulfonic acid (MOPS).

The ink may comprise an anti-kogation agent to reduce kogation of the ink. According to some embodiments, the ink comprises up to about 5 wt. % anti-kogation agent. According to some of these embodiments, the ink comprises up to about 2 wt. % or up to about 1 wt. % anti-kogation agent. According to some embodiments, the ink comprises at least about 0.1 wt. % anti-kogation agent. According to some of the embodiments, the ink comprises at least about 0.2 wt. % or at least about 0.5 wt. % anti-kogation agent.

The ink may comprise a metal chelator to bind transition metal cations that may be present in the ink. Exemplary metal chelators include ethylenediaminetetraacetic acid (EDTA), diethylenetriaminepentaacetic acid (DTPA), trans-1,2-diaminocyclohexanetetraacetic acid (CDTA), (ethylenedioxy)diethylenedinitrilotetraacetic acid (EGTA), or other chelators that can bind transition metal cations.

According to some embodiments, the ink comprises no more than about 15 wt. % performance enhancing additives (e.g. biocide, pH control agent, metal chelating agent, and anti-kogation agent). According to some of these embodiments, the ink comprises no more than about 5 wt. % performance enhancing additives. According to some of these embodiments, the ink comprises no more than about 2 wt. % performance enhancing additives.

The dye-based inks described above may be configured for use in conjunction with a fluid deposition system that deposits the ink on a medium to form an image. In some embodiments, the dye-based inks described above may be configured for use in an ink jet printer.

There are various methods which may be utilized to control the deposition of ink droplets on the image-recording element to yield the desired image. In one process, known as continuous ink jet printing, a continuous stream of droplets is charged and deflected in an imagewise manner onto the surface of the image-recording element, while unimaged droplets are caught and returned to an ink sump. In another process, known as drop-on-demand ink jet printing, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

FIG. 1 schematically illustrates fluid deposition system 10 configured to deposit a fluid 12 upon a medium 14. Fluid 12 comprises a liquid material such as ink which creates an image upon medium 14. In other applications, fluid 12 may include or carry non-imaging materials, wherein system 10 is utilized to precisely and accurately distribute, proportion and locate materials along medium 14.

Medium 14 comprises a structure upon which fluid 12 is to be deposited. Medium 14 may comprise a sheet or roll of a cellulose based or polymeric based material, structures which are more three dimensional in shape, textiles, wood, plastic, and/or some other medium upon which fluid 12 can be deposited.

According to some embodiments, a fluid deposition system may be configured to deposit inks of more than one color. According to some embodiments, a black ink of the fluid deposition system is comprised of one of a dye-based ink and a pigment-based ink, and a non-black ink (i.e. a colored ink such as red, blue, yellow, etc.) of the fluid deposition system is comprised of the other of a dye-based ink and a pigment-based ink. According to some of these embodiments, the black ink comprises a dye-based ink and the non-black ink comprises a pigment-based ink. Particularly, in some embodiments, the black dye-based ink is formulated as discussed above.

The following examples are presented to illustrate the present embodiments and to assist one of ordinary skill in making and using the same. The examples are not intended in any way to limit the scope of the claims.

EXAMPLE 1

An ink comprises,
 a) 8 wt. % of 1-(2-ethylhydroxy)-2-pyrrolidinone
 b) 8 wt. % of 2-pyrrolidinone
 c) up to 1 wt % of ink jet ink additives such as biocides, buffers, and surfactants
 d) 4 wt. % Direct Black 168
 e) the balance water

EXAMPLE 2

An ink comprises,
 a) 8 wt. % of 1-(2-ethylhydroxy)-2-pyrrolidinone
 b) 8 wt. % 3-pyridylcarbinol
 c) up to 1 wt % of ink jet ink additives such as biocides, buffers, and surfactants
 d) 4 wt. % Direct Black 168
 e) the balance water

EXAMPLE 3

An ink comprises,
 a) 8 wt. % of 1-(2-ethylhydroxy)-2-pyrrolidinone
 b) 8 wt. % of N-(2-hydroxyethyl)morpholine
 c) up to 1 wt. % of ink jet ink additives such as biocides, buffers, and surfactants
 d) 4 wt. % Direct Black 168
 e) the balance water

EXAMPLE 4

An ink comprises,
 a) 8.0 wt. % 2-pyrrolidinone
 b) 8.0 wt. % 1-(2-hydroxyethyl)-2-imidazolidinone
 c) 0.1 wt % biocide
 d) 0.2 wt. % buffer (which can be MES, Trizma, or MOPS)
 e) 4.0 wt. % anionic black dye

EXAMPLE 5

An ink comprises,
 a) 8.0 wt. % 2-pyrrolidinone
 b) 0.1 wt. % biocide
 c) 0.2 wt. % buffer (which can be MES, Trizma, or MOPS)
 d) 4.0 wt. % anionic black dye

EXAMPLE 6

Figure 2:
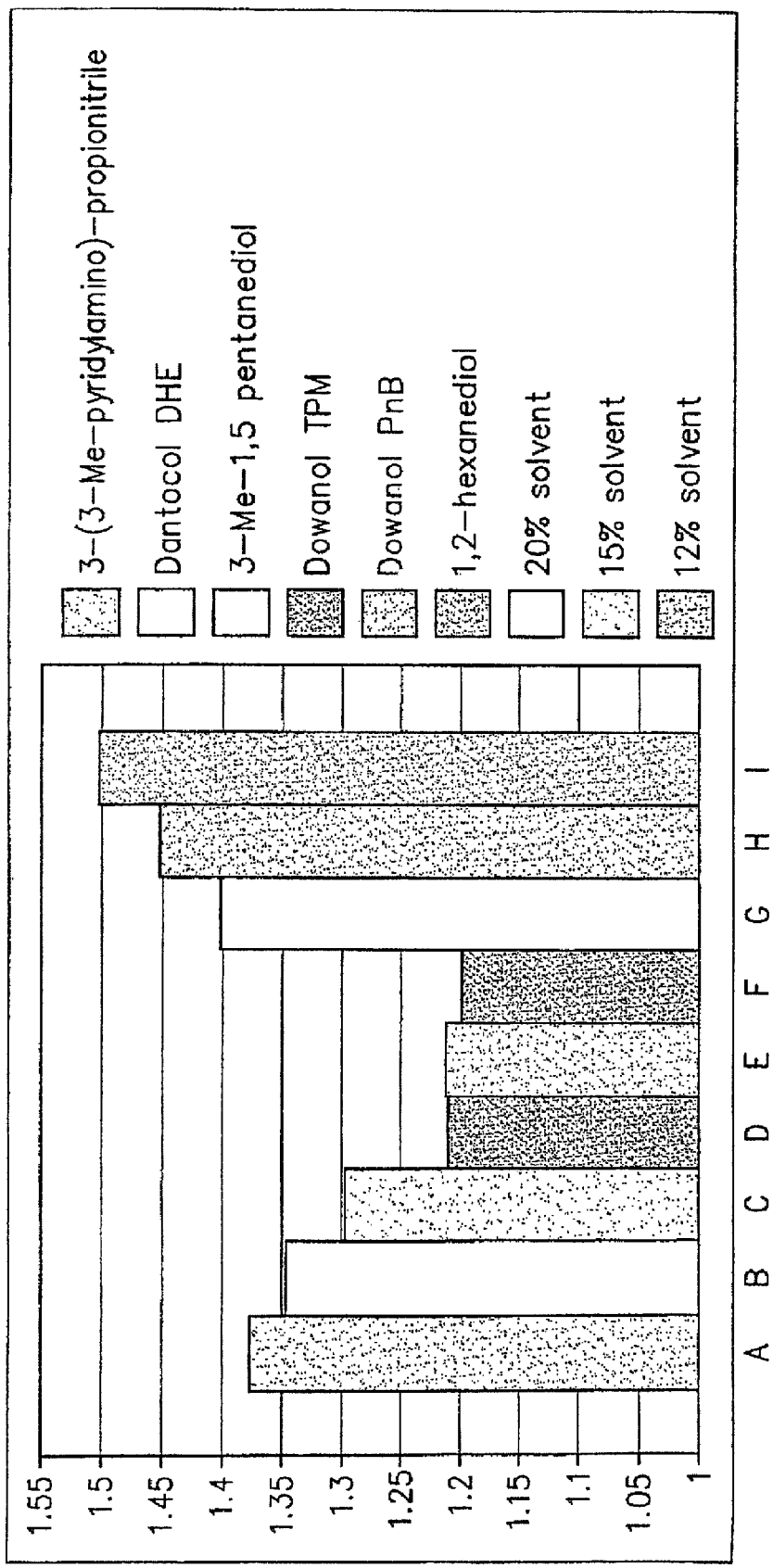
FIG. 2 is a graph of optical density achieved by inks of various formulations.

Referring to FIG. 2, a plurality of dye-based inks were printed on plain paper and optical density was measured for each sample using HP plain paper.

| Ink | Cosolvent | Dye |
|---|---|---|
| A | 15 wt. % 3-(3-Me-pyridylamino)-propionitrile | 4 wt. % of Direct Black 168 |
| B | 15 wt. % Dantocol DHE | 4 wt. % of Direct Black 168 |
| C | 15 wt. % 3-Me-1,5-pentanediol | 4 wt. % of Direct Black 168 |
| D | 15 wt. % Dowanol TPM | 4 wt. % of Direct Black 168 |
| E | 15 wt. % Dowanol PnB | 4 wt. % of Direct Black 168 |
| F | 15 wt. % 1,2-hexanediol | 4 wt. % of Direct Black 168 |
| G | 10 wt. % 1-(2-hydroxyethyl)-2-pyrrolidinone 10 wt. % 2-pyrrolidinone | 4 wt. % of Direct Black 168 |
| H | 7.5 wt. % 1-(2-hydroxyethyl)-2-pyrrolidinone 7.5 wt. % 2-pyrrolidinone | 4 wt. % of Direct Black 168 |
| I | 6 wt. % 1-(2-hydroxyethyl)-2-pyrrolidinone 6 wt. % 2-pyrrolidinone | 4 wt. % of Direct Black 168 |

As can be seen in FIG. 2, inks G, H, and I have optical densities of at least 1.4. As can also been seen, the optical density of the formulations of inks G, H, and I decreased as the amount of cosolvent increased.

EXAMPLE 7

Figure 3:
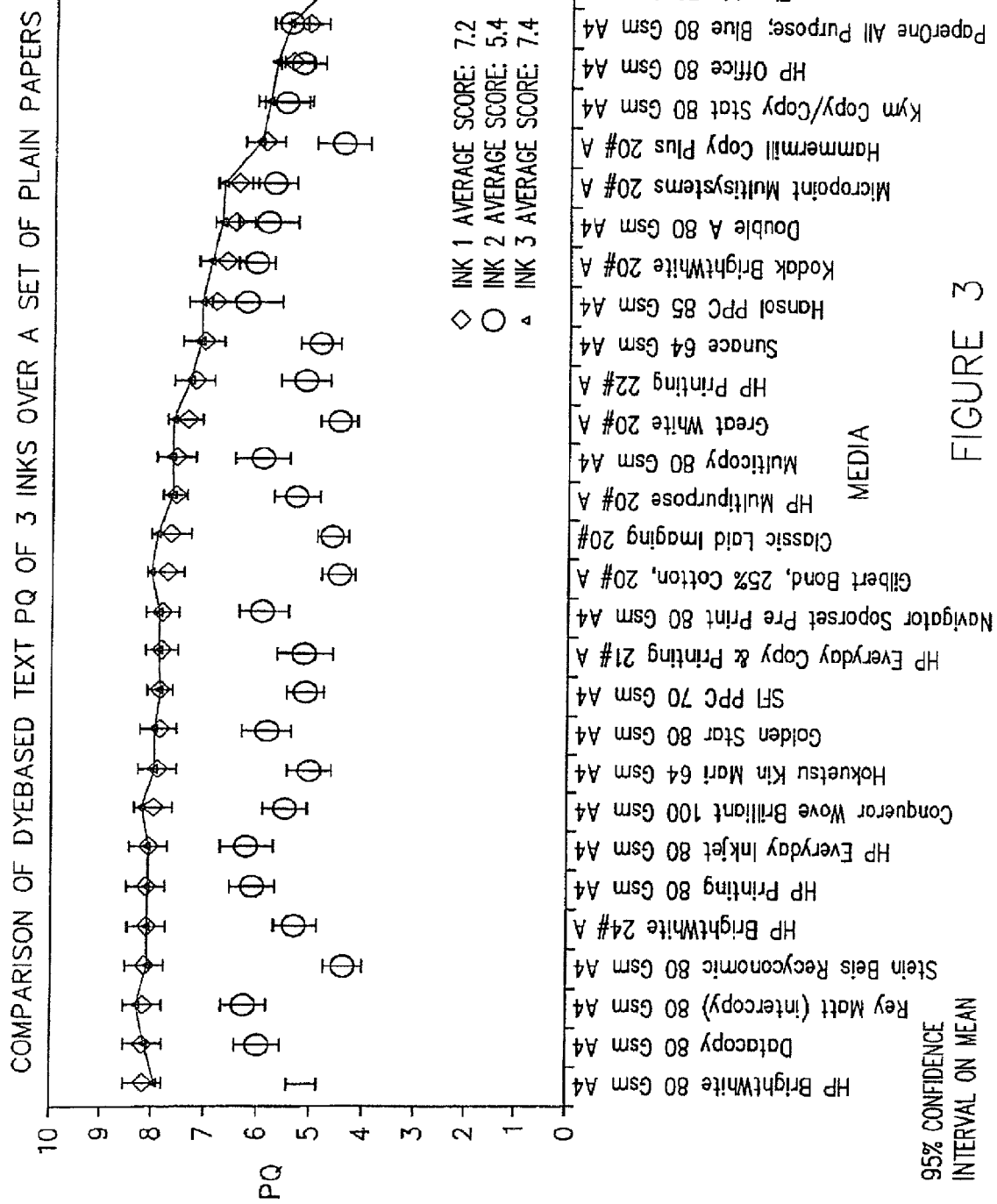
FIG. 3 is a comparison of print quality of an exemplary dye-based ink according to the disclosure, a pigment-based ink having a high print quality, and a traditional dye-based ink.

Referring to FIG. 3, the print quality (PQ) of three inks were measured. Ink 1 is an ink formulation according to example 4. Ink 2 is an exemplary traditional dye-based ink (not formulated as discussed above), sold for use with the Epson 870 printer. Ink 3 is an exemplary pigment-based ink, sold for use with the 800 and 900 series HP Deskjet.

PQ scores were measured by comparison to known samples. The maximum score of 10 is given to output from a Laser printer. Pigment-based blacks, like those used in the HP800 and 900 series or the Lexmark Z22/23 printers, which are judged to have high print quality commonly score higher than 7. To show paper independence, print quality is scored over a selection of "plain" papers. Inks 1, 2, and 3 were printed using an ink jet printer.

PQ scores (y-axis) are shown for the three different inks over such a selection of papers (X-axis). The papers used in this example include HP BrightWhite 80 Gsm A4, Datacopy 80 Gsm A4, Rey Matt (Intercopy) 80 Gsm A4, Stein Beis Recyconomic 80 Gsm A4, HP BrightWhite 24# A, HP Printing 80 Gsm A4, HP Everyday Ink jet 80 Gsm A4, Conqueror Wove Brilliant 100 Gsm A4, Hokuetsu Kin Mari 64 Gsm A4, Golden Star 80 Gsm A4, SFI PPC 70 Gsm A4, HP Everyday Copy & Printing 21# A, Navigator Soporset Pre Print 80 Gsm A4, Gilbert Bond, 25% cotton, 20# A, Classic Laid Imaging 20#, HP Multipurpose 20# A, Multicopy 80 Gsm A4, Great White 20# A, HP Printing 22# A, Sunace 64 Gsm A4, Hansol PPC 85 Gsm A4, Kodak BrightWhite 20# A, Double A 80 Gsm A4, Microprint Multisystems 20# A, Hammermill Copy Plus 20# A, Kym Copy/Copy Stat 80 Gsm A4, HP Office 80 Gsm A4, PaperOne All Purpose—Blue 80 Gsm A4, and Flagship 70 Gsm A4.

As can be seen in FIG. 3, Ink 1 (the dye-based ink as described in this application) has about the same print quality as Ink 3 (a pigment-based ink), while Ink 2 (a traditional dye-based ink) does not have at least about the same print quality as Ink 3. Rather, Ink 2 has a significantly lower print quality than Ink 3.

Based on observations of inks formulated according to various examples according to the present disclosure, results similar to those of Ink 1 should be achievable using various black dyes in combination with any of the specific cosolvents listed above.

ILLUSTRATIVE EMBODIMENTS

A number of illustrative embodiments of the dye-based inks, and applications incorporating such inks are discussed herein. The embodiments described are intended to provide illustrative examples of the present additives and uses are not intended to limit the scope of the claimed subject matter.

One embodiment is directed to a dye-based ink. The ink comprises a dye and a solvent. The dye-based ink has a high print quality on plain paper.

Another embodiment is directed to a dye-based ink. The ink comprises a dye and a cosolvent. All cosolvent in the ink consists essentially of cosolvent having an $E_T(30)$ value of about 25 kcal/mol to about 45 kcal/mol.

An additional embodiment is directed to a dye-based ink. The ink comprises a dye and a cosolvent. The cosolvent in the ink consists essentially of cosolvent selected from a group consisting of 2-pyrrolidinone, 1-(2-hydroxyethyl)-2-pyrrolidinone, 3-pyridylcarbinol, 4-pyridylcarbinol, 3-(3-pyridylamino)-propionitrile, 4-(2-hydroxylethyl)-morpholine, 4-hydroxy-1-methyl-piperidine, and combinations thereof.

Another embodiment is directed to a dye-based ink. The ink comprises about 0.1 wt. % to about 10 wt. % dye, about 6 wt. % to about 20 wt. % cosolvent, up to about 0.5 wt. % high HLB surfactant, and up to about 15 wt. % additives selected from a group consisting of biocides, pH control agents, anti-kogation agents, and combinations thereof. All cosolvent in the ink consists essentially of cosolvent having an $E_T(30)$ value of about 25 kcal/mol to about 45 kcal/mol.

Another embodiment is directed to a dye-based ink. The ink comprises a dye and a solvent. The ink has an optical density of at least about 1.45 on plain paper.

Another embodiment is directed to a dye-based ink. The ink comprises a dye and a solvent. The dye-based ink has an edge acuity and optical density at least about the same as a pigment-based ink having a high print quality.

An additional embodiment is directed to a method for forming an image using a fluid deposition system. The method comprises depositing a dye-based ink on a medium, the dye-based ink being a black ink, and depositing a pigment-based ink on a medium, the pigment-based ink being a non-black ink. The dye-based ink has a high print quality on plain paper and has a print quality on plain paper at least similar to the pigment-based ink.

Another embodiment is directed to a fluid supply. The fluid supply comprises a reservoir, the reservoir containing a dye-based ink. The dye-based ink may be formulated according to any of the above listed illustrative embodiments.

Another embodiment is directed to a fluid deposition system. The system comprises a fluid-dispensing device configured to dispense fluid upon a medium; and a fluid supply including a reservoir. The reservoir comprises an interior in fluid communication with a fluid-dispensing device, the reservoir containing a dye-based ink. The dye-based ink may be formulated according to any of the above listed illustrative embodiments.

Another embodiment is directed to a composition. The composition comprises a media having an image printed on the media. The image is formed by a black dye and has a high print quality. Print quality may be judged by comparison to a similar image printed on a similar media using a pigment from a pigment-based ink known to have a high print quality on plain paper. The media may be plain paper.

For each of the above listed inks, the ink may be a black ink or may be a non-black ink. For each of the fluid supplies discussed above, the fluid supply may be configured for use with an ink jet printer. For each of the fluid deposition systems discussed above, the fluid deposition system may comprise an ink jet printer.

The invention has been described with reference to various specific and illustrative embodiments and techniques. However, it should be understood that many variations and modifications may be made while remaining within the spirit and scope of the invention. For instance, the listed dyes and cosolvents are exemplary only and do not represent an exhaustive list. Further, while the examples only show the use of a single dye in a given ink, an ink may be composed of more than one dye.

What is claimed is:

1. A dye-based ink, comprising:
   a dye;
   from about 5 wt. % to about 20 wt. % cosolvents, the cosolvents including:
     2-pyrrolidinone; and
     one of: 1-(2-hydroxyethyl)-2-pyrrolidinone, or 1-(2-hydroxyethyl)-2-imidazolidinone; and
   a high HLB surfactant chosen from polymeric alkoxylates and sulfonyl surfactants.

2. The dye-based ink according to claim 1 wherein the dye-based ink includes from about 0.1 wt. % to about 10 wt. % dye, and wherein the dye-based ink further comprises:
   up to about 0.5 wt. % of the high HLB surfactant; and
   up to about 15 wt. % additives selected from a group consisting of biocides, pH control agents, anti-kogation agents, and combinations thereof;
   wherein the ink is configured to have an optical density of at least about 1.4 on plain paper.

3. The dye-based ink according to claim 1 wherein the cosolvents have an $E_T(30)$ value from about 35 kcal/mole to about 45 kcal/mol.

4. The dye-based ink according to claim 2 wherein the cosolvents have an $E_T(30)$ value from about 35 kcal/mole to about 45 kcal/mol.

5. The dye-based ink according to claim 1 wherein the ink is a black ink.

6. The dye-based ink according to claim 1 wherein the dye is anionic.

7. The dye-based ink according to claim 1, further comprising a humectant having an $E_T(30)$ value from about 30 kcal/mol to about 45 kcal/mol.

8. The dye-based ink according to claim 1 wherein the ink includes from about 10 wt. % to about 16 wt. % cosolvents.

9. A fluid supply system including the dye-based ink according to claim 1, the fluid supply system comprising a reservoir, the reservoir containing the dye-based ink.

10. The fluid supply system according to claim 9 wherein the dye-based ink includes from about 0.1 wt. % to about 10 wt. % dye, and wherein the dye-based ink further comprises:
  up to about 0.5 wt. % of the high HLB surfactant; and
  up to about 15 wt. % additives selected from a group consisting of biocides, pH control agents, anti-kogation agents, and combinations thereof;
  wherein the ink is configured to have an optical density of at least about 1.4 on plain paper.

11. A method for forming an image using a fluid deposition system, comprising:
  depositing a dye-based ink on a medium, the dye-based ink being a black ink, and wherein the dye-based ink includes:
    a dye;
    from about 5 wt. % to about 20 wt. % cosolvents, the cosolvents including:
      2-pyrrolidinone; and
      one of: 1-(2-hydroxyethyl)-2-pyrrolidinone, or 1-(2-hydroxyethyl)-2-imidazolidinone; and
    a high HLB surfactant chosen from polymeric alkoxylates and sulfonyl surfactants; and
  depositing a pigment-based ink on the medium, the pigment-based ink being a non-black ink;
  wherein the dye-based ink has a print quality of at least 1.4 on plain paper, and has a print quality on plain paper about the same as the pigment-based ink.

12. The method according to claim 11 wherein the dye-based ink includes form about 0.1 wt. % to about 10 wt. % dye, and wherein the dye-based ink further comprises:
  up to about 0.5 wt. % of the high HLB surfactant; and
  up to about 15 wt. % additives selected from a group consisting of biocides, pH control agents, anti-kogation agents, and combinations thereof;
  wherein the ink is configured to have an optical density of at least about 1.4 on plain paper.

13. The method according to claim 11 wherein the dye-based ink further comprises a humectant having an $E_T(30)$ value from about 30 kcal/mol to about 45 kcal/mol.

14. The method according to claim 11 wherein the cosolvents have an $E_T(30)$ value from about 35 kcal/mol to about 45 kcal/mol.

15. The dye-based ink according to claim 1 wherein the dye is chosen from an azo dye, a phthalocyanine dye, a xanthene dye, or combinations thereof.

16. The dye-based ink according to claim 15 wherein the dye is at least one of sulfonated, carboxylated, or metallized.

\* \* \* \* \*

UNITED STATES PATENT AND TRADEMARK OFFICE
CERTIFICATE OF CORRECTION

| | | |
|---|---|---|
| PATENT NO. | : 8,147,602 B2 | Page 1 of 1 |
| APPLICATION NO. | : 12/683592 | |
| DATED | : April 3, 2012 | |
| INVENTOR(S) | : Hiang P Lauw et al. | |

It is certified that error appears in the above-identified patent and that said Letters Patent is hereby corrected as shown below:

In column 10, line 14, in Claim 12, delete "form" and insert -- from --, therefor.

Signed and Sealed this
Nineteenth Day of February, 2013

Teresa Stanek Rea
*Acting Director of the United States Patent and Trademark Office*